(12) United States Patent
Rudigier-Voigt et al.

(10) Patent No.: US 10,451,781 B2
(45) Date of Patent: Oct. 22, 2019

(54) OPTICAL FILTER

(71) Applicant: SCHOTT AG, Mainz (DE)

(72) Inventors: Eveline Rudigier-Voigt, Mainz (DE); Sven Rebsamen, Münterappel (DE); Joerg Schuhmacher, Kornwestheim (DE); Franziska Back, Schweinfurth (DE)

(73) Assignee: SCHOTT AG, Mainz (DE)

( * ) Notice: Subject to any disclaimer, the term of this patent is extended or adjusted under 35 U.S.C. 154(b) by 364 days.

(21) Appl. No.: 15/186,574

(22) Filed: Jun. 20, 2016

(65) Prior Publication Data

US 2016/0291223 A1    Oct. 6, 2016

Related U.S. Application Data

(63) Continuation of application No. PCT/EP2014/078635, filed on Dec. 19, 2014.

(30) Foreign Application Priority Data

Dec. 20, 2013  (DE) .......... 10 2013 022 162
Jul. 30, 2014  (DE) .......... 10 2014 011 357

(51) Int. Cl.
*F21V 9/04* (2018.01)
*F21V 9/06* (2018.01)
(Continued)

(52) U.S. Cl.
CPC ............. *G02B 5/208* (2013.01); *B05D 1/005* (2013.01); *G02B 1/11* (2013.01); *G02B 5/223* (2013.01)

(58) Field of Classification Search
CPC ........ G02B 5/208; G02B 5/223; G02B 5/226; G02B 5/0294; G02B 1/11;
(Continued)

(56) References Cited

U.S. PATENT DOCUMENTS 5,441,803 A     8/1995  Meissner
6,157,025 A *  12/2000  Katagiri ............. G02B 6/29361
                                                             250/226
(Continued)

FOREIGN PATENT DOCUMENTS

CN     1300948     6/2001
CN     1825608     8/2006
(Continued)

OTHER PUBLICATIONS

English Translation of Written Opinion of the International Searching Authority dated Feb. 24, 2015 for corresponding PCT/EP2014/078635, 6 pages.
(Continued)

*Primary Examiner* — Mustak Choudhury
(74) *Attorney, Agent, or Firm* — Ohlandt, Greeley, Ruggiero & Perle, L.L.P.

(57) ABSTRACT

An optical filter, a process for producing an optical filter, and the use of the optical filter are provided. The optical filter includes a substrate and a filter layer on at least one side of the substrate. The filter layer has a matrix and at least one organic dye dissolved in the matrix. The filter layer has optical homogeneity.

27 Claims, 5 Drawing Sheets

(51) Int. Cl.
*G02B 5/08* (2006.01)
*G02B 5/20* (2006.01)
*G02B 5/22* (2006.01)
*B05D 1/00* (2006.01)
*G02B 1/11* (2015.01)

(58) Field of Classification Search
CPC ............ G02B 5/20–5/28; G02B 5/201; G02B 5/281–5/288; G02B 1/111; G02B 6/29361; G02B 6/29395; G02B 6/4246; G02B 6/2937; B05D 1/005; G03F 7/0007; G03F 7/033; G03B 11/00; G02C 7/104; G02C 7/10; C09B 67/0041; H04N 9/045; H01L 27/14621; H01L 27/14685
USPC ....... 359/356, 359, 885, 887; 351/44, 159.6, 351/159.62; 313/112, 503, 504; 348/272, 222.1, 280; 356/418, 419
See application file for complete search history.

(56) References Cited

U.S. PATENT DOCUMENTS

| | | | |
|---|---|---|---|
| 6,595,030 | B1 | 7/2003 | Bauch |
| 6,612,697 | B1* | 9/2003 | Aurelius ................ G02B 5/226 351/159.62 |
| 6,771,314 | B1* | 8/2004 | Bawolek ................ H04N 9/045 348/222.1 |
| 7,477,385 | B2 | 1/2009 | Lotz |
| 7,907,347 | B2 | 3/2011 | Eva |
| 2001/0005278 | A1 | 6/2001 | Onomichi |
| 2003/0127968 | A1 | 7/2003 | Kuma |
| 2004/0102548 | A1 | 5/2004 | Suzuki |
| 2006/0187381 | A1 | 8/2006 | Yokozawa |
| 2010/0110242 | A1* | 5/2010 | Motallebi ............. C07C 225/34 348/273 |
| 2011/0042556 | A1 | 2/2011 | Natsuaki |
| 2012/0243077 | A1* | 9/2012 | Osawa ................ G02B 3/0056 359/356 |
| 2013/0309448 | A1 | 11/2013 | Striegler et al. |
| 2014/0146538 | A1 | 5/2014 | Zenker et al. |

FOREIGN PATENT DOCUMENTS

| | | |
|---|---|---|
| DE | 102010045149 | 3/2012 |
| DE | 102011009235 | 7/2012 |
| DE | 102011050870 | 12/2012 |
| EP | 1445988 | 8/2004 |
| EP | 1414762 | 1/2005 |
| GB | 2225445 | 5/1990 |
| JP | 2012103340 | 5/2012 |
| JP | 2013064975 | 4/2013 |
| TW | 588558 | 5/2004 |
| WO | 2007025011 | 3/2007 |
| WO | 2012031837 | 3/2012 |

OTHER PUBLICATIONS

English Translation of International Preliminary Report on Patentability dated Jun. 21, 2016 for corresponding PCT/EP2014/078635, 8 pages.
"Standard Test Method for Haze and Luminous Transmittance of Transparent Plastics" ASTM International, D1003-13, 2013, 7 pages.
English Translation of International Search Report for corresponding PCT/EP2014/078635, 2 pages.

* cited by examiner

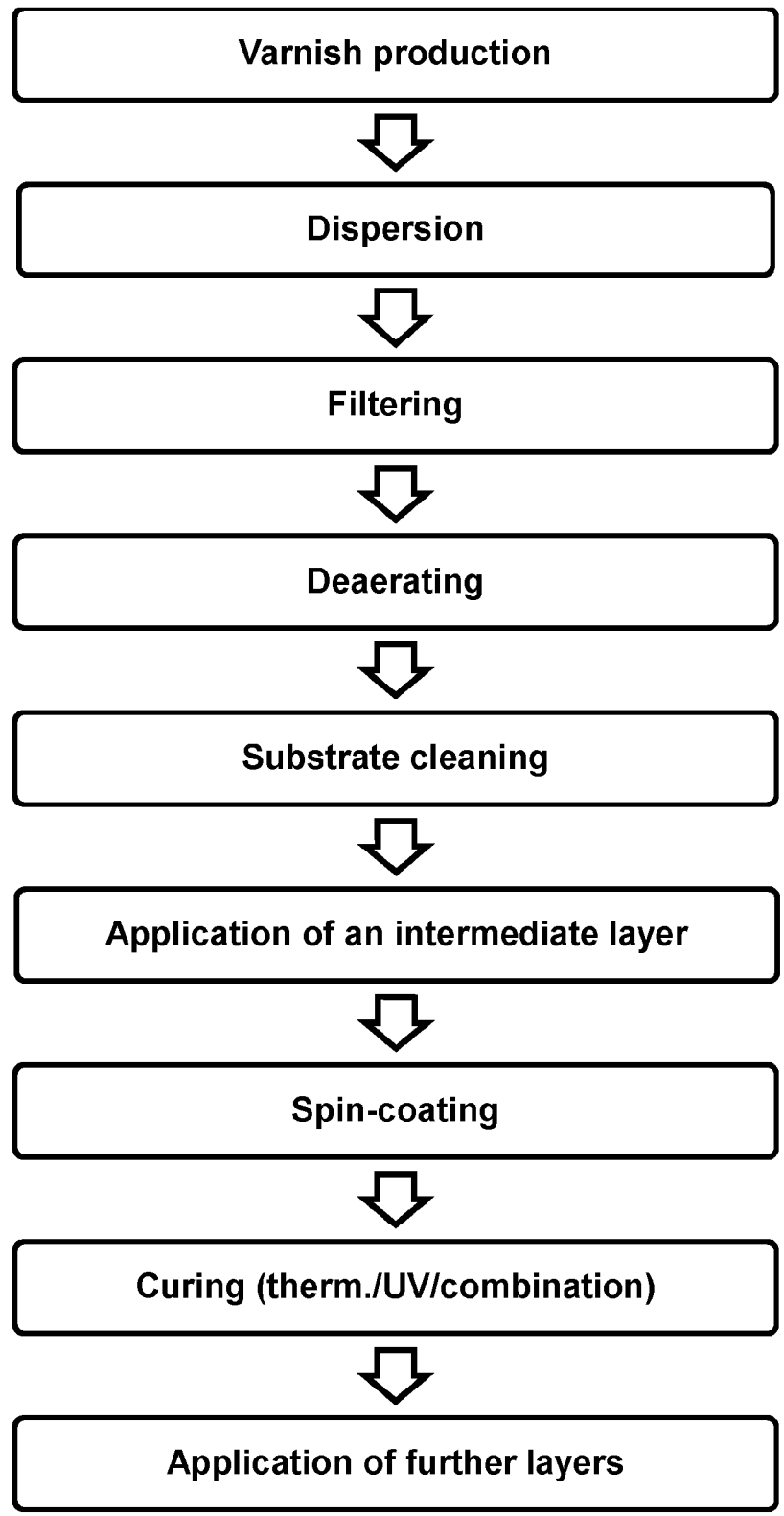

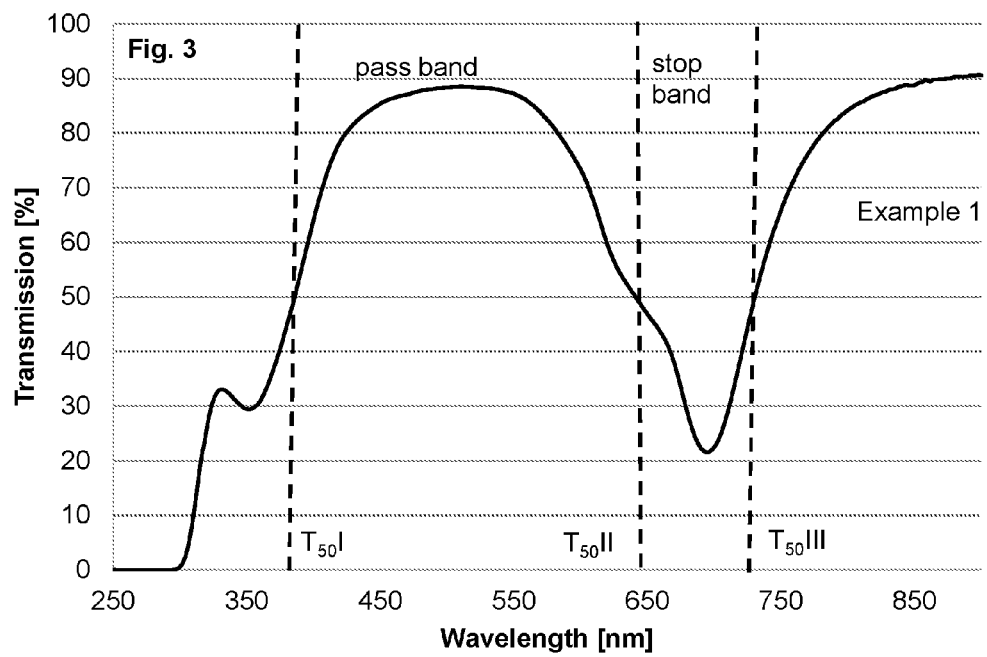
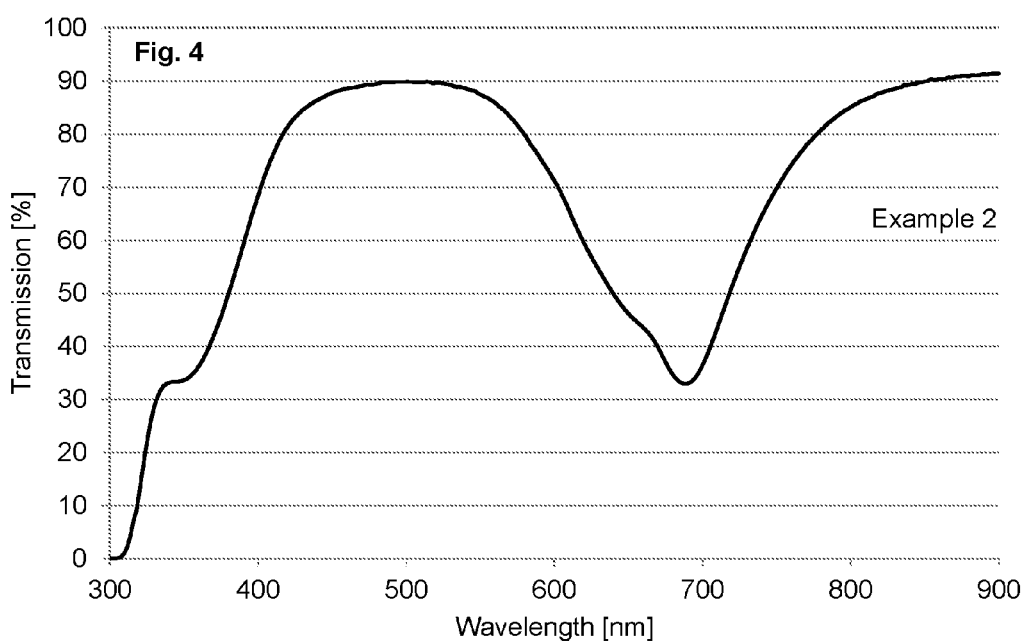

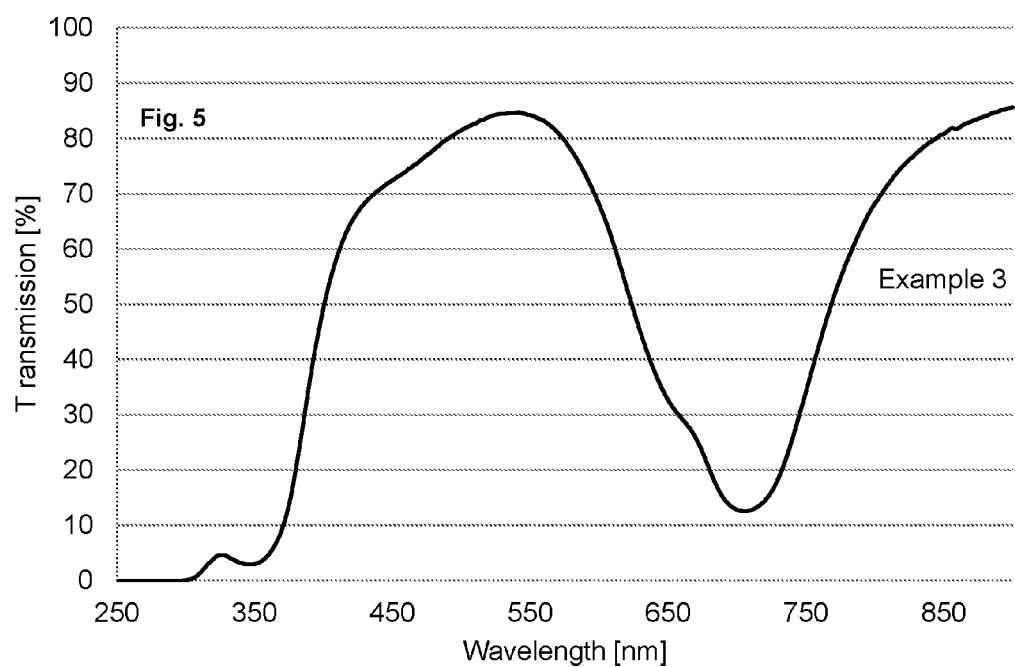
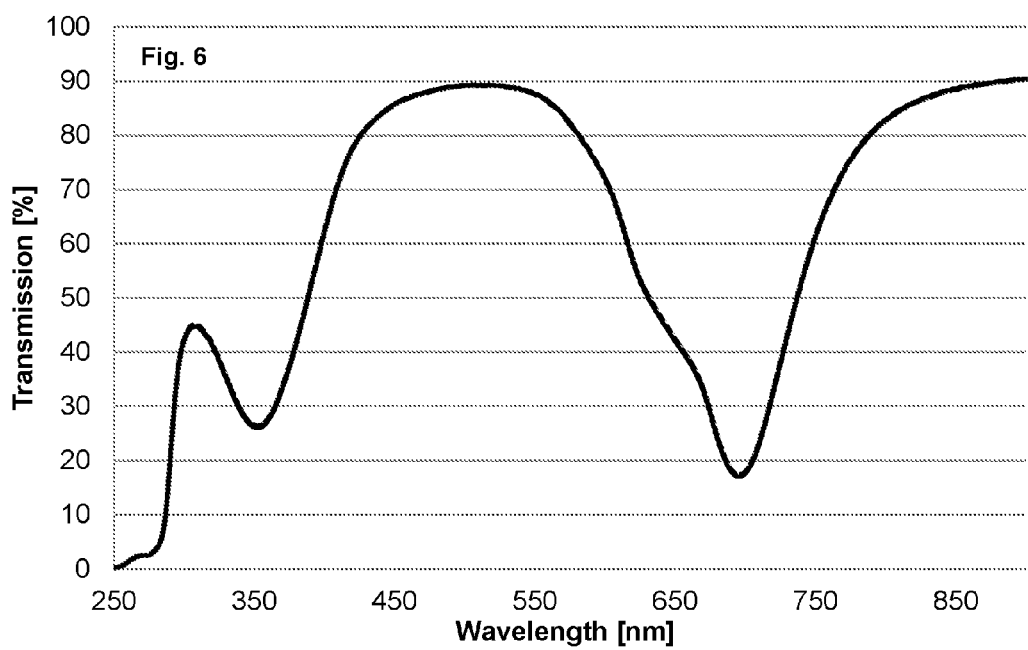

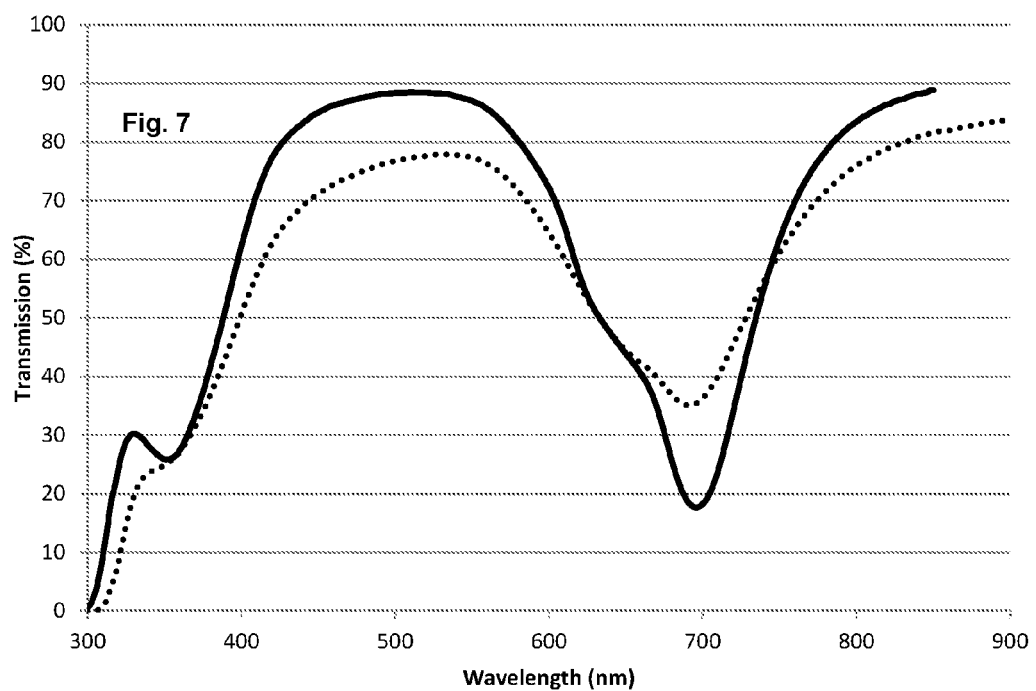
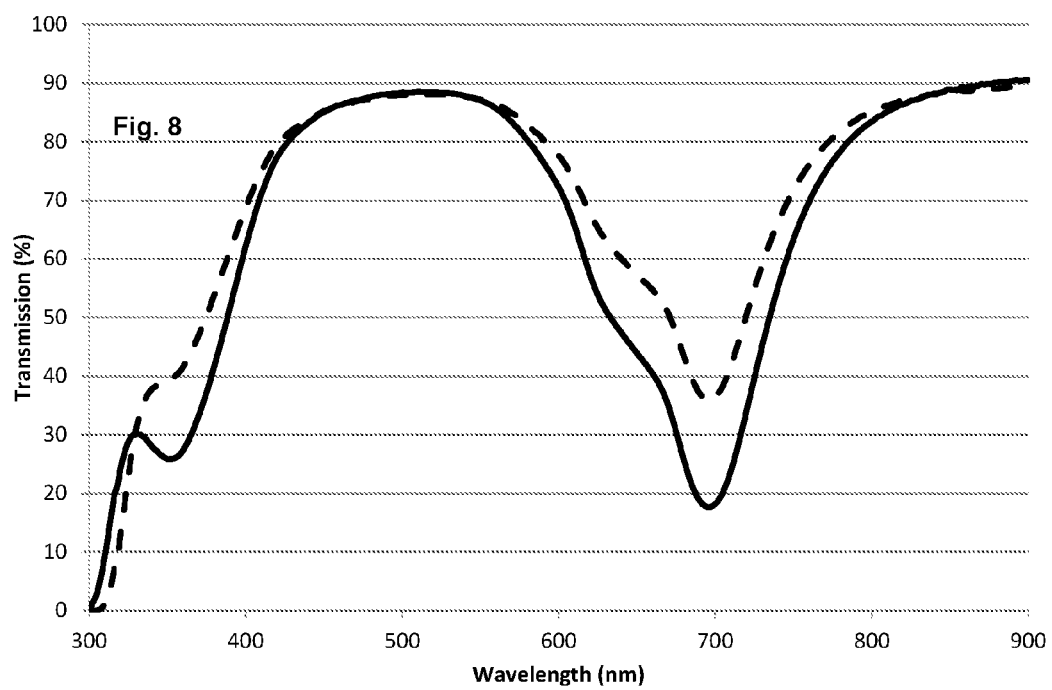

OPTICAL FILTER

CROSS REFERENCE TO RELATED APPLICATIONS

This application is a continuation of International Application No. PCT/EP2014/078635 filed Dec. 19, 2014, which claims the benefit under 35 U.S.C. § 119(a) of German Application No. 10 2013 022 162.5 filed Dec. 20, 2013 and German Application No. 10 2014 011 357.4 filed Jul. 30, 2014, the entire contents of all of which are incorporated herein by reference.

BACKGROUND

1. Field of the Invention

The present invention relates to an optical filter, to a process for producing an optical filter, and to the use of the filter of the invention.

2. Description of Related Art

Most available filters and filter systems which are used in the field of cameras, mobile phones, or else WLP (wafer-level packaging)-based electronics are based on inorganic systems. The aim of such systems is generally to achieve an exactly on-spec transmission curve, for example a steep edge in the region of 650 nm. Frequently, what is called blue glass is used, i.e. an optical glass, for example a fluorophosphate glass, to which coloring glass constituents, for example CuO, have been added. In addition, layers containing inorganic constituents or multiple layer systems are used. When blue glass is used, there are limitations with regard to some aspects when optical properties are very good: firstly, the glass is only of limited corrosion stability; secondly, glass thicknesses less than 300 µm are achievable only with difficulty because of the brittleness of the material, or the production thereof is associated with high costs. Moreover, the coefficient of thermal expansion (CTE) of the glass restricts further processing by some bonding methods, for example "wafer-level packaging" (WLP), which are standard methods in microelectronics. Multiple layers or layers having inorganic particles have the problem that the optical properties are fulfilled only inadequately and, in the case of particle-filled systems, significant scatter (haze) frequently occurs, which creates unwanted optical effects, i.e. optical losses in the form of reduced transmission and image deterioration.

The "haze" or "haze value" (also called opacity, turbidity) is an optical parameter for description of the scattering characteristics of a material, especially for the haze of transparent samples. The value describes the proportion of light transmitted which is scattered forward by the translucent sample. Thus, the haze value quantifies the influence of particles in the surface or the structure which disrupt transparency. These particles may either have been introduced deliberately or may result from material defects. The method for measuring the haze value is described in standard ASTM D 1003. The standard requires the measurement of four spectra. For each spectrum, the light transmittance is calculated. The four transmittances are converted to the % haze value.

Multiple layer systems or interference filters having good optical properties are standard nowadays in filters of this kind. Since the light is not absorbed in these layers, multiple reflections occur in the filter, which become "ghost images". Only through optical absorption in layers or in the substrate can these ghost images be avoided. On the other hand, multiple layer systems having the desired filter function with steep edges are very costly and therefore unsuitable for implementation.

In addition, there now exist on the market plastic-based films having good optical properties combined with low costs. However, the optical properties and the stability of the film deteriorate in stress tests such as thermal and climatic stress and resistance to chemicals such as isopropanol, and are unsuitable for WLP processes for these reasons.

Polyurethane (PU) coatings are known from the prior art. WO 2007/025011 A1 describes anti-scratch layers for mobile phone displays and other display components, where these layers may be uncolored or tinted. There is no hint as to the way in which this color can be created and which selection criteria can be used, and how intense the tint can be, and the system described does not have any filter function in the sense of a controlled optical design.

WO 2012/031837 A1 describes a PU-based coating system for display areas on smooth transparent shaped bodies which have a transmission in the visible range from 1% to 20% and are color-stable up to 150° C., which does not lower the impact resistance/flexural strength of the substrate and is sufficiently opaque to conceal illuminated displays and other components of the display. Thus, the systems described here are unsuitable for use in the field of filter systems for microelectronics/optics and processes such as WLP, since temperatures of briefly >250° C. are achieved here at least briefly.

SUMMARY

The problem addressed by the present invention is thus that of providing a filter which can be produced inexpensively in low thicknesses and with good optical filter properties, for example homogeneity and haze. The filter should also have sufficient mechanical and thermal stability and good chemical and climatic stability.

More particularly, an optical filter is provided, comprising a substrate and, on at least one side of the substrate, a filter layer wherein the filter layer comprises a matrix containing at least one organic dye dissolved in the matrix.

The filter of the invention comprises a substrate and at least one filter layer. The filter layer comprises a matrix and at least one dye incorporated into the matrix.

BRIEF DESCRIPTION OF THE DRAWINGS

FIG. 2 shows a schematic of one embodiment of a coating process of the invention.

FIG. 3 shows a transmission curve of a filter according to Example 1.

FIG. 4 shows a transmission curve of a filter according to Example 2.

FIG. 5 shows a transmission curve of a filter according to Example 3.

FIG. 6 shows a homogeneity measurement on a filter according to Example 1.

FIG. 7 shows a comparison of transmission curves of filters having filter layers.

FIG. 8 shows a comparison of transmission curves of filters having filter layers.

DETAILED DESCRIPTION

Figure 1:
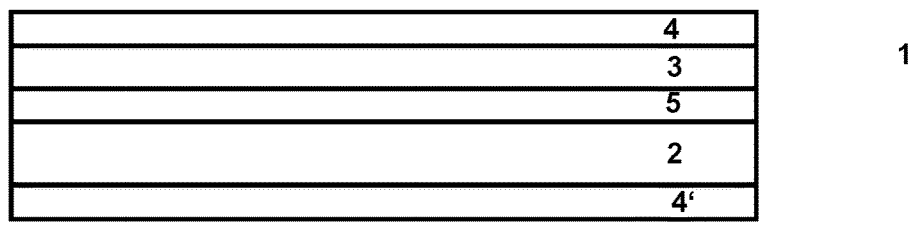
FIG. 1 shows a schematic diagram of one variant of a filter of the invention.

FIG. 1 shows a schematic diagram of one variant of the inventive filter 1. At least one filter layer 3 has been applied on the substrate 2. Optionally, antireflection coatings 4 and/or 4' may have been applied on the top and/or bottom side. In addition, an intermediate layer 5 may have been applied, for example, for improvement of the bond strength of the filter layer 3 between substrate 2 and filter layer 3. Layers 4, 4' and/or 5 may optionally also have a function of fine adjustment of the optical properties of the filters; for example, they may have an IR-blocking function.

FIG. 2 shows a schematic of one embodiment of the coating process of the invention.

FIG. 3 shows a transmission curve of an inventive filter according to example 1 and the definitions of the pass band and stop band of the filter, including the $T_{50}$ values.

FIGS. 4 and 5 show transmission curves of inventive filters according to examples 2 and 3.

FIG. 6 shows the result of a homogeneity measurement on a filter according to example 1, i.e. transmission curves measured at four different points on the filter. The curves are superposed exactly on one another; the filter therefore has high optical homogeneity.

FIG. 7 shows the comparison of transmission curves of filters having filter layers which have been applied firstly by spin-coating (solid line), and secondly by screen-printing (dotted curve). The transmission in the pass band of the filter layer applied by means of spin-coating is much better than the layer applied by means of screen-printing.

FIG. 8 shows the comparison of transmission curves of filters having filter layers which have been applied with different spin-coating parameters. Although both curves are better than the layer applied by means of screen-printing, a further improvement in the transmission curve can be achieved by adjusting the spin-coating parameters.

The filter of the invention has good optical properties.

The filters of the invention, compared to prior art filters, have surprisingly low scatter or surprisingly low haze. The haze value of the filter is preferably less than 10%, further preferably less than 5%, more preferably less than 3%, most preferably less than 1%. The haze value is preferably determined with a Byk Haze-gard Plus measuring instrument.

In addition, they have a lower roughness than prior art filters, as a result of which layers having low scatter are obtained. More particularly, the roughness of the filter layer $R_a$ is less than 0.5 μm, especially less than 0.3 μm and preferably less than 0.001 μm, which is comparable to the roughness of the uncoated substrate.

FIG. 3 shows the inventive definition of the pass band and stop band, and the $T_{50}$ values for a bandpass filter. The filter of the invention is characterized by the transmission in the pass band and the transmission in the stop band. The pass band is understood in accordance with the invention to mean the band between $T_{50}I$ and $T_{50}II$. The pass band should have maximum transmission. More particularly, the transmission within the pass band should at least partly, i.e. for a wavelength range within the pass band, be at least 70%, preferably at most 80%, more preferably at least 85%. The stop band is understood in accordance with the invention to mean the band after $T_{50}II$. According to a variant as shown in FIG. 3, the stop band may be adjoined by a further band having high transmission. In such a variant, another, third value $T_{50}III$ may be specified for characterization of the curve. The stop band should have minimum transmission. More particularly, the transmission within the pass band should at least partly, i.e. for a wavelength range within the stop band, be at most 40%, preferably at most 30%, more preferably at most 25%. Preferably, the mean transmission in the stop band is not more than 50%, preferably not more than 40%, more preferably not more than 30%. The value $T_{50}$ describes a wavelength at which the value of 50% transmission is exceeded. In the case of filters, this value is passed through before entry into the transmission region, referred to here as $T_{50}I$, and after exit from the transmission region, referred to here as $T_{50}II$. According to the invention, $T_{50}II$ simultaneously indicates entry into the stop band, and $T_{50}III$ entry into a further pass band. What are called longpass and shortpass filters have only one $T_{50}$ value between the stop band and pass band.

Moreover, the breadth of the pass band in which the transmission is more than 70%, 80% or 85% should be at a maximum.

In one variant of the invention, the filter of the invention is blue filter or an NIR-cut filter. In that case, the region having a transmission of more than 70%, preferably more than 85%, begins preferably at a wavelength of 460 nm, preferably 450 nm, more preferably 440 nm, and/or ends preferably no earlier than at 540 nm, preferably 550 nm, more preferably at 560 nm. More particularly, the $T_{50}II$ should be at 650 nm+/−30 nm, the mean transmission in the range from 450 to 550 nm at 87% (+/−5%), and the breadth of the wavelength range around $T_{50}II$ from a transmission of 70% to a transmission of 30% not more than 80 nm (+/−10 nm) (measure of the steepness of the band edge).

The filter layer 3 preferably has a layer thickness of at least 0.1 μm, further preferably at least 0.5 μm, more preferably at least 1 μm, and in specific embodiments at least 2 μm. The layer thickness is preferably not more than 15 μm, more preferably not more than 12 μm, and in one variant not more than 10 μm. In specific embodiments, it is also possible that greater layer thicknesses of, for example, not more than 20 μm or not more than 100 μm may be preferable.

The filter of the invention has a thickness of preferably not more than 2 mm, more preferably not more than 1 mm and/or at least 0.1 mm. In one variant of the invention, in the case of use of ultrathin glasses, substrates provided may also be filters having a thickness of less than 0.1 mm, for example filters having a layer thickness of 0.05 mm or 0.025 mm. in this variant, the filter layer 3 also has only a very low thickness of not more than 10 μm or not more than 5 μm.

The filter layer has a homogeneity of the layer thickness over the entire coating area of preferably at least 15%, more preferably at least 10% and most preferably at least 5%. This homogeneity of the layer thickness is preferably achieved in the finished filter, but in the case of production of filters via wafers over the entire wafer surface area, i.e. over an area having a diameter of 8 or 12 inches or even 16 inches. In a further embodiment, the wafer may also be square or rectangular, in which case the diameter describes the diagonal. According to the invention, the term "filter" may encompass either the individualized filters or a wafer for production of filters.

By virtue of the great homogeneity of the layer thickness of the filter layer, the filter of the invention has good optical homogeneity, especially a wavelength deviation in $T_{50}II$ of preferably not more than 5%, preferably not more than 3%, more preferably of not more than 1%.

The filter of the invention also has excellent mechanical properties, especially in terms of bond strength and abrasion resistance to MIL-C-48497, as follows:

Bond strength is determined by an adhesive tape test (applying the adhesive tape, for example Tesafilm, and gradually pulling it off via the corner). Preferably, in this test, less than 10% of the test area, preferably less than 2%, is detached, and there is more preferably no detachment.

Abrasion resistance is determined by a scrubbing test with a "cheesecloth" (see definition of cheesecloth according to US Federal Standard CCC-C-440) with an applied weight of 500 g and 50 strokes. Preferably, the filters of the invention pass this test without any deterioration in the optical properties.

The filter has good chemical resistance (for example to water, isopropanol, ethanol) and a high climatic stability (according to MIL-C-675A: 95% rel. AH at 49° C., 24 h) and long-term stability (according to MIL-STD-810C) with constant absorption properties.

The expression "constant absorption properties" means that the change in transmission in the pass and stop bands before and after the stress test is not more than +/−5%. A significant change in the absorption properties, in contrast, is understood to mean a change in transmission of more than +/−10%, especially more than +/−5%.

For the long-term stability, a test is also effected by the following methods: (i) temperature/air humidity test: 1000 h at 85° C. and 85% rel. AH and (ii) cyclical moist heat test: from −20 to 65° C. at 90% rel. AH with a temperature ramp of <1° C./min and 14 repetitions. Preferably, the filters of the invention pass this test without any deterioration in the optical properties.

Variants of the filter of the invention have high thermal stability, meaning that the filter can be heated to a temperature in the range from 220 to 270° C. with constant absorption properties for a period of up to 10 min, as defined above. More particularly, because of the use of the thermally stable matrix, there is no significant change in transmission and no additional absorption, for example because of yellowing of the matrix material as a result of organic breakdown reactions.

The "relevant wavelength range" is understood in accordance with the invention especially to mean the wavelength range from 405 to 700 nm, preferably from 400 to 800 nm, and in one embodiment from 400 to 2500 nm. In particular embodiments, the relevant wavelength range may begin at 300 nm, 330 nm, 350 nm, 380 or 400 nm, provided that substrate and matrix have sufficient transparency in the UV range. In addition, the upper limit of the relevant wavelength range may be at 2400 nm, 1500 nm, 1000 nm, or 800 nm, provided that this is sufficient for the planned use.

The filter of the invention may simultaneously serve as carrier or substrate for electronic components, i.e. as printed circuit board. Printed circuit boards consist of electrically insulating material having adherent conductive connections (conductor tracks). Being an insulating material, the filter of the invention can also be used as substrate. The conductor tracks can be etched from a thin metallic layer, or structured by means of a photolithography method by means of lift-off methodology. Typically, copper or silver or gold layers are used as conductive material, these usually also having a (metallic) adhesion promoter layer. The latter may consist, for example, of titanium, although a number of further adhesion promoter layers are known. By means of a buffer layer, known as solder resist in the printed circuit board industry, it is possible to expose regions in which contacts can be formed with the conductor tracks. Placed from these exposed metallic areas are solder points ("bumps"), which establish contacts with the CMOS chip or the printed circuit board later in the soldering operation. Electrical contacts are thus formed with the components. At the same time, they can also be held mechanically by the contacts. Larger components can also be secured on the printed circuit board with cable ties, adhesive or screw connections. Because of the thermal stress in the soldering operation, the filter layer has to have thermal stability in order to be able to be heated at least briefly to the temperature needed for soldering.

The substrate is preferably optically inactive, i.e. transparent, in the relevant wavelength range, and has a transmission of at least 85%, preferably at least 90%, more preferably at least 91%, with limitation of the maximum transmission to about 92% because of the reflection at the two substrate surfaces having the refractive index $n_d$ of about 1.5 without an additional antireflection layer. In addition, the substrate should have thermal stability of preferably at least 300° C., more preferably at least 400° C.

Useful materials for the substrate for the filter of the invention include glass, glass-ceramic, crystals, plastics and optoceramic, preference being given to glass substrates, more preferably thin glass substrates.

The substrates may be flat substrates having two planar faces or else lenticular substrates having one or two curved surfaces. It is possible for one or else both surfaces of the substrates to be coated. Preferably, the surface of the substrates to be coated is unstructured and does not have any depressions or elevations. Preferably, the surface to be coated has a surface roughness of not more than 50 nm rms.

In one embodiment, transparent glasses (e.g. borosilicate glass, soda-lime glass, aluminosilicate glass, alkaline earth metal silicate glass, quartz glass or alkali-free glasses) are used, which may have been rolled or floated or may have been produced by (as described, for example, in EP 1 414 762 B1) from drawing processes such as the down-draw or up-draw processes or an overflow fusion method. In the case of glasses which, because of the process for production thereof, can be produced only in relatively high thicknesses, for example greater than 1 mm, it is possible to produce a suitably thin substrate by mechanical processing with grinding, lapping and/or polishing methods or a redrawing method.

In one variant, substrates used are thin glasses, i.e. glasses having a thickness of 100 μm to 2 mm, or ultrathin glasses, i.e. glasses having a thickness of 25 μm to 100 μm. Suitable examples of such thin glasses are the glasses sold by SCHOTT AG under the AF32, D263, B270 names, for example.

Another kind of substrate used may be an optical glass as supplied, for example, by SCHOTT AG under the PSK glasses, BASF glasses, LAF glasses, LASF glasses, BK glasses or LF glasses name.

In a further particular embodiment, a transparent ceramic, specifically an optoceramic, is used.

Crystalline substrates used, in a further embodiment, may, for example, be calcium fluoride or sapphire.

Substrates used may additionally be plastics or polymers, preferably transparent plastics. Especially optical plastics suitable, for example the thermoplastic polymers polymethylmethacrylate PMMA, cycloolefin copolymer COC, cycloolefin polymer COP, polycarbonate PC, Plexiglas, nylon, ABS, methylpentene, polyetherimide, polystyrene, NAS and SAN. However, preference is additionally given to those plastics which do not contain any water and barely absorb it, if at all, for example COC and COP.

For downstream processes, for example wafer-level packaging, the coefficient of thermal expansion of the filter may be highly significant. Here, the filter of the invention has the advantage over bulk glass or polymer solutions that the coefficient of thermal expansion is determined essentially by the glass substrate used and can be matched to the particular bonding partners, for example silicon. Preference is given to substrates having a coefficient of thermal expansion CTE or $\alpha$ (20,300) in the range from 3 to 9.4 $10^{-6}K^{-1}$.

In a particular embodiment, a pretensioned substrate is used. The pretension may have been chemically or thermally induced.

The substrate used may also be a glass having absorbing properties. The absorption properties of such a glass can be used for fine adjustment of the transmission profile of the filter.

The matrix contains at least one dye present in dissolved form in the matrix, meaning that it does not show any lasting streak formation in the production of the coating solution or the varnish production and enables a homogeneously colored matrix. The dye(s) should also give sufficiently intense coloring and be thermally stable enough to withstand the stress in the course of crosslinking of the binder system and in later use.

In a preferred embodiment, such an organic dye is soluble in a customary solvent.

In one variant of the invention, preference is given to dyes which have lasting thermal stability up to at least 140° C. and briefly withstand thermal stresses from 150° C. to 300° C., preferably 200 to 270° C. The term "lasting" is understood to mean a period of more than 60 min, preferably at least 100 hours. Under the term "briefly" a period of not more than 60 min, preferably not more than 30 min.

Useful dyes preferably include organic dyes selected from the group consisting of azo dyes, polymethine dyes, cyanine dyes, triphenylmethane dyes, carbonyl dyes: anthraquinones, indigo, porphyrins and phthalocyanines, preference being given to phthalocyanines and porphyrins.

According to the relevant wavelength range, a dye having suitable absorption properties is selected. For the production of a blue filter or an IR-cut filter, it is possible to use blue-green dyes.

Phthalocyanines (tetrabenzotetraazaporphyrins) are notable for high chemical and thermal stability. According to the invention, it is possible to use phthalocyanines having different central atoms, for example Pb, Zn, Al, Ga, Si, Ti, Cu or V. A pigment that does not contain this central atom has a turquoise appearance (Pigment Blue 16) and may likewise be used.

Porphyrins are organic chemical dyes consisting of four pyrrole rings (tetrapyrrole) joined to one another in a cycle by four methine groups. The simplest representative is porphin.

Among the blue-green dyes, preference is given to those having a transmission maximum in the range from 550 to 750 nm, especially preferably in the range of 650 to 750 nm. Those used are specifically iron cyano complexes, indanthrone, indigo, phthalocyanines having Cu, Zn or V as central atom, preferably the β form of the phthalocyanines, for example of copper phthalocyanine (e.g. Orasol®, such as Orasol Blue GN, Orasol Blue 94416, Orasol Blue 94416), vanadium or zinc phthalocyanines (e.g. Epolight®), and chromium chelates, preferably $Cr^{3+}$ with ligands from the azo and azomethine series, e.g. Heliogen Blue 23050, Heliogen Blue 23080, Corimax Blue, from Kremer Pigmente and Marabu Glasfarben.

It is possible with preference to use the Epolight dyes from Epolin, i.e. the group of the NIR dyes of 700 nm, 800 nm, 900 nm, 1000 nm NIR Absorbing Dyes (for example 700A, 700B, 714A, 720B, 721A, 728A), phthalocyanines having different central atoms (such as Pb, Zn, Al, Ga, Si, Ti, Cu, and others), for example from Sigma Aldrich and from QCR Solutions Corp., including the group of the visible range 400 nm, 500 nm, 600 nm Visible Absorbing Dyes.

As well as the dyes already mentioned, also of high interest in particular are those which block in the IR range of >600 nm. Suitable for this purpose are especially dyes from the group of the tetrakis(alkyl)ammonium salts, in particular dyes from the group of tetrakis(alkyl)ammonium bromide or chloride, more preferably in straight-chain form with n≥4, and symmetric cyanines with n≥5, described by:

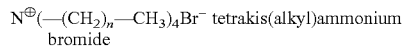

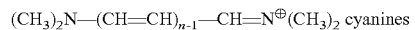

According to the invention, it is possible to use one of the aforementioned dyes or a combination of two or more thereof in the matrix.

As a further embodiment, it is possible to use dyes which absorb in the red region of the spectrum.

In addition, it is possible to use dyes having a suitable absorption spectrum for green contrast filters or gray filters.

In addition to the aforementioned soluble dyes, it is possible in accordance with the invention to incorporate fine-scale pigments, i.e. dyes insoluble in the solvents or coating solutions used, into the matrix. More particularly, if required, mixing one or more dyes with pigments may be a way of making the fine adjustment of the desired transmission profile in the relevant wavelength range.

In order to efficiently block, for example, IR light in the range of >750 nm, i.e. a transmission of <20% within this wavelength range, suitable examples are CuO or $Cu_3(PO)_4$ compounds or salts.

Suitable pigments in principle are all of those which do not have excessively high scatter, if any.

The finer the pigments, the lower the scatter. In the case of particle sizes >1 μm, a scatter of 5% to 40% in the wavelength range from 400 to 750 nm typically occurs, and so pigments of this kind are not preferred in accordance with the invention.

When pigments having particle sizes below 1 μm, called nanopigments, are used, the scatter may be reduced to less than 6% (0.1%-6%), especially to 4%-5%. When dispersing these nanopigments, it should be noted that they have to be finely dispersed in order to prevent agglomeration, which is possible, for example, by means of a three-roll mill or ultrasound treatment.

Preferably, these absorption pigments are in nanoscale form with a primary particle diameter of 2 to 5000 nm, preferably 8 to 1000 nm, very particularly 10 to 500 nm. Primary particles are generally understood to mean the particles in the unagglomerated state. Particle diameters can be determined via small-angle x-ray scattering (SAXS), dynamic light scattering (DLS) and/or Fraunhofer diffraction.

At least one dye as described above is dissolved in the matrix. The matrix preferably consists of a binder. Binders used may firstly be compounds which already have the properties required for the layer formation, for example plastics or polymers having a sufficient polymer weight. As a further variant, the matrix can be formed in situ by crosslinking and/or polymerization reactions after the substrate has been coated.

Binders used may be polyurethane resins, sol-gel compounds, hybrid polymers, silicones (organically and/or inorganically crosslinking), phenol resins, epoxides, polyamides, polyimide, EVA (ethylene-vinyl acetate) and polyester resins, and mixtures thereof.

It is possible to use various thermoplastics as polymer layers, such as cycloolefin copolymer COC, ionomers, polyamide PA, polyethylene terephthalate PET, polybutylene terephthalate PBT, polyether ketone PEK, polyoxymethylene POM, acrylate-based systems, polymethylmethacrylate and/or polystyrene PS, which feature high chemical and mechanical stability.

Among the polyester resins, preference is given to UP resins, i.e. unsaturated polyester resins. According to the reaction with acids or alcohols, it is possible to produce soft or hard polymer layers.

Alkyd resins can be processed with various film formers such as epoxy resins or else phenol resins. Use for varnish synthesis, yes according to the solvent may varnishes of low or higher viscosity be produced.

When EVA is used, it is preferable that the polyolefin fraction (i.e. the ethylene content) has a proportion of not more than 5%, since coating by spin-coating is otherwise more difficult as a result of the high viscosity of the binder solution. Suitable solvents for EVA are toluene, benzene and xylene.

In one variant of the invention, sol-gel compounds or polyurethane resins are preferred.

In the case of sol-gel compounds, the coating composition especially comprises sol-gel precursors of silicon, titanium, zirconium, aluminum, zinc, magnesium, calcium, tin or mixtures thereof. Very particular preference is given to the sol-gel precursors Si(ORx)Ry, Ti(ORx)Ry, Zr(ORx)Ry, Al(ORx)Ry, Zn(ORx)Ry, Mg(ORx)Ry, Ca(ORx)Ry and Sn(ORx)Ry. In these, preferably, Rx=hydrogen, alkyl, allyl or aryl and/or Ry=epoxy, methacrylate, acrylate, vinyl, allyl, amino, thiol, alkyl or aryl. The indices x and y add up to 4, i.e. x+y=4.

Preferably, the coating composition comprises a UV-curable and/or thermally curable hybrid-polymeric, hydrolyzed and condensed alkoxysilane precursor, especially glycidyloxypropyltriethoxysilane (GPTES) and/or methacryloyloxypropyltrimethoxysilane. These may also be functionalized with polysiloxanes. Preference is given to using methyl- and/or phenyl-functionalized polysiloxanes. The sol-gel layer on the substrate thus preferably comprises the reaction products of sol-gel precursors described herein with polysiloxanes described herein.

In a further embodiment, the binder composition comprises a polyurethane resin which forms through reaction of a polyisocyanate component with a polyol component. Polyisocyanates are understood to mean organic compounds containing two or more isocyanate groups (—N═C═O). Polyols are understood to mean organic compounds containing two or more hydroxyl groups (—OH). Reaction of polyisocyanates and polyols forms straight-chain or branched polyurethanes:

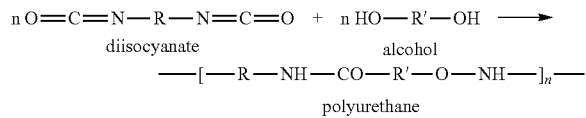

According to the invention, depending on the application, the following polyisocyanates may be used: aromatic isocyanates, e.g. tolylene 2,4-diisocyanate (TDI), diphenylmethane 4,4'-diisocyanate (MDI), cycloaliphatic and araliphatic isocyanates, e.g. isophorone diisocyanate (IPDI), methylcyclohexyl 2,4-diisocyanate (HTDI), xylylene diisocyanate (XDI), aliphatic isocyanates, e.g. hexamethylene diisocyanate (HDI), trimethylhexamethylene diisocyanate (TMDI) or cyclohexyl 1,4-diisocyanate (CHDI).

With aliphatic isocyanates, especially with HDI, it is possible to produce polyurethanes having excellent thermal stability which do not break down until 210 to 270° C. The thermal stability of polyurethane layers formed from aliphatic isocyanates is therefore sufficient for use as filter systems which are generally introduced via WLP (wafer-level packaging) processes in the component, since temperatures of 260° C. occur here briefly for a period of about 10 min, preferably less than 5 min. In the field of use, for example in camera modules, however, only temperatures well <150° C. occur.

Rather than monomeric polyisocyanates, it is preferably also possible to use polymers of the corresponding monomers, for example the dimers, trimers, oligomers or higher polymers thereof. In addition, it is possible to use polyhydric alcohols such as biurets, isocyanurates or adducts onto trimethylolpropane or similar compounds which convert the monomers to less volatile and hence more easily handled components through molecular enlargement.

Preference is further given to blocked polyisocyanates (called baking urethane resins, BU resins), in which the highly reactive isocyanate groups have been reversibly blocked by blocking agents. A blocked polyisocyanate eliminates the blocking agent while releasing the reactive isocyanate at elevated temperature, and so the crosslinking reaction has to be initiated by thermal treatment. Suitable blocking agents are, as well as alcohols and phenols, also other Brønsted acids (proton donors, compounds having acidic hydrogen) such as thioalcohols, thiophenols, oximes, hydroxamic esters, amines, amides, imides, lactams or dicarbonyl compounds and especially ε-caprolactam, butanone oxime, dimethylpyrazole, diisopropylamine and malonic esters, for example diethyl malonate. While it is possible to formulate butanone oxime-blocked HDI varnishes which already cure at 140 to 180° C. (5-60 min), somewhat higher temperatures are needed for crosslinking in the case of ε-caprolactam-blocked HDI (160-240° C., 5-60 min). Since the blocking agent is released in the course of crosslinking and diethyl malonate has no critical classification as a hazardous substance, and ε-caprolactam a less critical classification compared to butanone oxime, preference is given to aliphatic polyisocyanates blocked with malonic ester or with ε-caprolactam. Butanone oxime, ε-caprolactam and most of the other blocking agents escape to a considerable degree from the varnish film in the course of crosslinking, and are removed from the varnish with the waste air stream from the drier. This moves the reaction equilibrium from the side of the starting components to the side of the polyurethane.

Examples of suitable blocked aliphatic polymers of polyisocyanates are, for example, the Desmodur® products from Bayer Material Science, for example Desmodur® BL 3175 SN and Desmodur® BL 3272 MPA.

The equivalent weight can be calculated from the content of blocked isocyanate groups. If the average NCO functionality of the blocked polyisocyanates is known, it is possible to determine the average molecular weight therefrom. NCO functionality is understood to mean the number of blocked and of any free NCO groups per molecule. In the case of suitable BU resins, the NCO functionality is ≥2, especially 2.5-6, especially preferably 2.8-4.2. Suitable as an alternative, although not preferred, are resins having more than 6 blocked isocyanate groups per molecule.

The average molecular weight of preferred polymers of blocked polyisocyanates is 800-2000 g/mol. Polyisocyanates having molecular weights of 2000-10 000 g/mol may, however, likewise be suitable. The mean molecular weights can be determined, for example, via a GPC (gel permeation chromatography) measurement.

Co-reactants used for a polyisocyanate may in principle be any compounds containing a reactive (acidic) hydrogen atom. The reaction of the isocyanate groups with compounds containing reactive hydrogen atoms forms the polyurethane through polyaddition.

The properties of the polyurethane depend not just on the isocyanate component but also on the H-acidic compound chosen.

Polyols, especially polyester polyols and polyether polyols, are suitable, since mechanically and chemically very stable coatings can be obtained with these components. It has been found that polyester polyols are particularly suitable, especially branched polyester polyols having a high hydroxyl group content (preferably three or more hydroxyl groups per molecule, corresponding to an OH content of 2%-8% by weight, especially 3%-6% by weight) and a mean molecular weight in the range of 1000-2000 g/mol. These polyols lead, by virtue of their hydroxyl groups, to highly crosslinked polyurethane films, and so it is possible to produce particularly hard, scratch-resistant and chemically stable layers. The higher the level of branching of the polyether polyols and the more hydroxyl groups they have, the more highly crosslinked the polyurethane formed.

Examples of suitable polyester polyols are the Desmophen® products from Bayer Material Science Desmophen® 651 MPA, Desmophen® 680 BA and Desmophen® 670.

The molecular structure of most of the commercial polyester polyols and also of the abovementioned Desmophen® products cannot be stated exactly since the production generally gives a polymer mixture. However, the properties of the polyester polyols can be established reproducibly via the reaction regime, the products being characterizable via the hydroxyl content (OH number), mean molecular weight, density and viscosity. The average OH functionality is determined via the choice of starting components.

Control and knowledge of the hydroxyl content (OH content) of the polyol component (H-acidic or hydroxyl component) and knowledge of the content of blocked isocyanate groups (NCO content) of the polyisocyanate component are important because, theoretically, maximum crosslinking of the coating only takes place when equal stoichiometric amounts of isocyanate and hydroxyl component are used, i.e. when the stoichiometric ratio of isocyanate to hydroxyl component is 1:1 according to the following reaction equation:

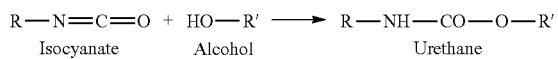

R—N=C=O + HO—R' ⟶ R—NH—CO—O—R'
  Isocyanate     Alcohol          Urethane

The maximum crosslinking density theoretically achievable at the stoichiometric ratio of 1:1 is crucial to the properties of the coating (adhesion, scratch resistance, flexibility, chemical and thermal stability). Isocyanate and hydroxyl component should therefore be in the stoichiometric ratio of 1:1 in the polyurethane system. The amounts needed therefor can be calculated via the equivalent weight.

Reduction in the polyisocyanate fraction (under-crosslinking) leads to more flexible coatings having lower mechanical and chemical stability and is therefore not preferred. Increase in the polyisocyanate fraction (over-crosslinking) increases the crosslinking density because the excess isocyanate groups react with air humidity to form urea groups. The use of polyisocyanate relative to polyol component in the equivalent ratios of 1.1:1 to 2:1 may therefore be advisable in order to increase scratch resistance or bond strength on the substrate via the hardness of the coating. Since the side reaction with water is also enabled by other factors such as the water content of the solvent or the residual moisture content of the substrate, which results in removal of isocyanate groups from the system which are then no longer available for a reaction with the hydroxyl groups of the polyol component, preference is given to equivalent ratios of polyisocyanate to polyol component in the order of magnitude of 1.1:1 to 2:1, especially of 1.2:1 to 1.5:1.

Of course, it is also possible to combine various H-acidic compounds, for example polyester polyols with silicone resins or epoxy resins, especially in order to adjust the film properties with regard to specific demands.

The thermal curing of the polyurethane system applied is effected by heating to 150° C.-260° C., especially by heating to 170-210° C., for a period of 10-120 min, especially of 60-90 min. The curing time is of essential significance for the bond strength and chemical stability; for example, curing at 180° C. for 45 min does not show any chemical stability with respect to isopropanol and fails the adhesive tape test, whereas curing at the same temperature for >60 min leads to both tests being passed. The heating results firstly in evaporation of the solvent out of the paint, and the isocyanate component is secondly deblocked, such that the crosslinking reaction with the H-acidic component (e.g. polyester polyol) proceeds and a solid film forms. Higher temperatures than 210° C. are generally not employed for a relatively long curing period (>30 min), since the polyurethane formed can break down over and above 200° C. The breakdown causes slight browning of the coating which is generally undesirable.

The reaction temperature required depends, inter alia, to a very substantial degree on the blocking agent with which the isocyanate component has been blocked. For instance, in the case of isocyanates blocked with butanone oxime, 140-180° C. is sufficient to start the crosslinking, whereas 160-240° C. is needed in the case of isocyanates blocked with ε-caprolactam. The necessary duration for sufficient crosslinking depends on the selection of isocyanate component and the H-acidic compound (polyester polyol). It can be shortened significantly (to a few minutes) by means of catalysts, for example by means of tertiary amines, but especially by means of metallic catalysts, e.g. Zn salts, Co salts, Fe salts, Sn(IV) salts, Sb salts and Sn(II) salts. Particularly suitable catalysts are tin(IV) alkoxylates, for example dibutyltin dilaurate and tetra(2-ethylhexyl) titanate, zinc naphthenate or cobalt naphthenate. The catalyst or catalyst mixture is added in an amount of 0.05%-1% by weight (based on the color paste).

A process for producing the filter preferably comprises the following steps: binder system production: dissolving the binder (one or two components) in the solvent; producing the varnish by dissolving the dye and optionally dispersing the pigments directly or the binder system and optionally further additives; optionally filtering the varnish; optionally deaerating the varnish; optionally cleaning the substrate; optionally applying an intermediate layer; applying the varnish, for example by spin-coating; optionally pre-drying the varnish (called "soft-baking"); drying and/or thermally curing and/or UV-curing the varnish; optionally applying further layers.

"Drying" is understood in accordance with the invention to mean that the binder is converted to the filter layer essentially without chemical reaction, meaning that only volatile constituents are removed from the coating solution.

The production of the filter layer preferably comprises the step of producing a coating solution. For production of the coating solution or the varnish, at least one dye and binder or a binder system are dissolved in a solvent. The coating solution is applied to the substrate and cured.

The binder may serve as solvent for the dye. If the viscosity of the binder is insufficient, a solvent may be added. Solvents especially assure that the viscosity and processibility of the varnish can be influenced. Through addition of solvents, it is possible to apply the filter layer in a coating process, where the amount of the solvent or the viscosity of the coating solution has a crucial influence on the resulting layer thickness. It should be noted here that the formation and characteristics of the film surface may also depend on the solvents used. Solvents having very high evaporation levels, i.e. a high vapor pressure, are less suitable since a skin can be formed on the surface. This changes the flow characteristics; hydrodynamic instabilities can occur, which ultimately lead to formation of lateral coating structures which proceed in a star shape from the center of rotation. Moreover, hygroscopic solvents are unsuitable, in that they attract water from the environment but are not miscible therewith. In that case, there can be separation effects, which likewise causes lateral structures. Therefore, preference is given to solvents having a vapor pressure of <120 hPa (at standard conditions: 20° C.), especially preferably <60 hPa, in order to assure good processibility.

Preferred solvents are alcohols, ethers and mixtures thereof. Preference is given to using n-butyl acetate, carbitol, carbitol acetate, butylcarbitol acetate, ethyl acetate, methanol, ethanol, 1-propanol, dimethylformamide (DMF), ethylene glycol monoethyl ether, diethylene glycol monoethyl ether, tripropylene glycol monomethyl ether, dichloromethane, 1,2,3-trichloro-propane, cyclohexane, tetrahydrofuran, 4-hydroxy-4-methyl-2-pentanone, ethyl methyl ketone, cyclohexanone and mixtures thereof.

For the production of thin polymer films for a spin-coating method, according to the prior art, preference is given to using 1,2,3-trichloropropane (vapor pressure 2.8 hPa at 20° C.) or cyclohexanone (vapor pressure 4.55 hPa at 20° C.) or DMF (vapor pressure 3.77 hPa at 20° C.). In general, between 10% and 30%, based on the total mass of the coating solution, is used.

Surprisingly, however, it is found that a mixture of at least one solvent having a low vapor pressure <2 hPas (under standard conditions) with at least one solvent having a high vapor pressure >100 hPas likewise showed good results.

It is possible to add further additives to the coating solution, such as adhesion promoters, defoamers, leveling additives, levellers, deaerators, lubricant additives, substrate wetting additives, wetting and dispersing additives, rheology additives, radiation-curing and anti-blocking (UV blocker) additives. These additives may make up to 5% by weight, preferably up to 2% by weight, of the coating solution. They can be purchased commercially, for example, from TEGO (EVONIK) and are known to those skilled in the art as typical paint additives.

Specifically, these are pure and/or organically modified low molecular weight polysiloxanes and/or organic polymers and/or fluorine-functionalized polymers and/or polyether-modified and/or polysiloxanes and or polyacrylates and/or basic and acidic fatty acid derivatives.

Many organic dyes have the disadvantage of being unstable to UV radiation in spite of having the desired transmission characteristics and possibly also high thermal stability. For this reason, in a further embodiment, it is possible to add anti-blocking additives to increase the UV stability. The effect of such blocking additives derives from the deactivation of free radicals, and they are generally referred to as HALS ("hindered amine light stabilizers") and, in chemical terms, are generally derivatives of TMP (2,2,6,6-tetramethylpiperidine).

According to the coating method, it is also possible to add various leveling agents, for example PEG, BYK 302, BYK 306, TEGO Wet or TEGO Rad products, in order to achieve homogeneous layer thicknesses. Especially in the case of coating of non-smooth, uneven surfaces, a wetting agent/leveling agent which assures homogeneous leveling of the layer in spite of unevenness is added. For spin-coating, preference is given to solvents which allow good wetting of the surface and suitable are additionally additives such as leveling agents and wetting agents to be used; these may, for example, be ethyl methyl ketone or butylcarbitol acetate.

If the binder system is too fluid for the coating process and the solvent fraction cannot be reduced any further, the viscosity can be increased by adding rheology additives. Otherwise, the varnish, depending on the spin-coating parameters chosen, would become too thin and the filter layer would not absorb sufficiently.

Typically, thickening, i.e. an increase in viscosity, can be achieved by adding resins such as polyacrylates, polysiloxanes, thixotropic acrylic resins and isocyanate- or urethane-thixotroped alkyd resins, or by reducing the solvent fraction. Waxes such as hydrogenated castor oil or polyolefin waxes are also suitable, or associative thickeners such as associative acrylate thickeners, hydrophobically modified cellulose ethers, hydrophobically modified ether urethanes ("polyurethane thickeners"), hydrophobically modified polyethers or modified ureas. In the selection of the thickeners, however, it is necessary to take account of whether the color film is to be further coated, for example. In this case, waxes in particular are unsuitable as thickeners.

In addition, it is possible to add what are called hardeners, for example to increase the layer hardness/scratch resistance, for example nanoparticles, bisepoxides.

The preferred proportions by weight of the different constituents of the coating solutions for application of filter layers to substrates depend on the binder used.

More particularly, a viscosity suitable for the coating method is established.

For a spin-coating method, it is preferable to adjust the viscosity of the binder mixture to not more than 100 mPas, preferably not more than 50 mPas, especially preferably not more than 20 mPas.

The tables which follow state preferred proportions by weight of the constituents of coating solutions by way of example for a polyurethane system and GPTES.

| | Proportions in % by weight | | | |
|---|---|---|---|---|
| | PU system | Solvent | Dye | Additives |
| preferably | 22-99 | 1-80 | <10 | <10 |
| more preferably | 41-90 | 2-60 | <5 | <5 |
| especially preferably | 60-80 | 20-35 | <1 | < |

| | Proportions in % by weight | | | |
|---|---|---|---|---|
| | GPTES | Solvent | Dye | Additives |
| preferably | 22-99 | 1-80 | <10 | <10 |
| more preferably | 30-80 | 30-60 | <5 | <5 |
| especially preferably | 40-60 | 40-50 | <2 | <1 |

The dye content needed to achieve the desired transmission in the coating depends on the layer thickness of the coating and is, according to the layer thickness, 0.1%-45% by weight (based on the cured coating). The dye content corresponds to a binder content of 55%-99.9% by weight. In the case of higher layer thicknesses, lower dye contents are needed than in the case of low layer thicknesses, in order to achieve the desired wavelength-dependent absorption and hence lowering of the transmission. By changing the concentration, it is additionally also possible to influence the steepness of the band edge of the filter, since saturation effects are established at higher concentrations. This can be exploited for controlled adjustment of the shape of the band edge of the filter. Dye contents of more than 45% by weight are not preferred since the scratch resistance and bond strength would then no longer be adequate.

In a dried and cured filter layer, the mass ratio of dye to binder 1 is 200:1 to 50:1, preferably 175:1 to 60:1, very especially preferably 150:1 to 100:1.

In a dried and cured filter layer, the mass ratio of dye to binder 2 is 100:1 to 3:1, preferably 50:1 to 5:1, very especially preferably 40:1 to 25:1.

All constituents, the matrix, the dyes and the functional additives, are homogenized, preferably by means of a Dispermat (Ultraturrax) or three-roll mill.

The finished varnish can be pressure-filtered, in order to remove lint, dust or other particles introduced from the raw materials or in the production process. Alternatively, the varnish can be filtered through an ultrafine filter prior to coating.

The coating can be effected in one or more layers, preference being given to a one-layer coating.

In a specific embodiment, the filter layer is applied to the substrate only in a local or structured or recessed manner. However, preference is given to coating the substrate over the full area.

The substrate can be coated by spin-coating, spraying, dipping, casting, painting, screen-printing, pad-printing, inkjet printing, offset printing, roll-coating, or other methods known to those skilled in the art. For these coating methods, the viscosity of the color matrix has to be matched to the processibility.

Preference is given in accordance with the invention to a spin-coating method or rotary coating method, since very homogeneous filter layers can be applied by such a method.

For spin-coating, all materials present in solution are suitable. The substrate is fixed to a turntable, called the chuck, generally by means of vacuum suction on the underside. A metering device over the center of the substrate is used to apply the desired amount of the solution.

The spin-coating process is divided into three steps: step 1: distributing the coating solution; moderate acceleration and speeds are characteristic here, typically in the range of 200-2000 rpm, but depending on the spin-coater used; step 2: coating; moderate to high speeds are required here, in order to coat the substrate homogeneously, typically in the range of 1000-10 000 rpm, but depending on the spin-coater used; step 3: spinning off excess material, for which high speeds are necessary, typically >2000 rpm, but depending on the spin-coater used.

In order to obtain a solid layer, it is necessary to remove the solvent. A portion of the solvent already evaporates in the course of spin-coating. The removal of the solvent can be forced by means of a heated chuck or by subsequent baking on a hotplate (heat treatment, also called soft baking). One reason why this treatment is advantageous is that moderate temperatures in the soft-baking prevent the solvent from generating bubbles in the layer, as is often the case when heating is rapid. Moreover, the layer becomes "dust-dry", meaning that dust and suspended particles essentially do not adhere any longer on the surface, and so contamination can be more easily removed.

For spin-coating, particular preference is given to a solvent, for example ketones or acetates, which allows good wetting of the surface and is suitable for additional use of additives such as leveling agents and wetting aids.

After the coating, the color layers, if required, are thermally cured and/or UV-cured. Preferably, the layers are baked at temperatures of >150° C., preferably >170° C. For this purpose, it is possible to use standard equipment; in the case of UV curing or combinations of UV curing with thermal curing, it is possible, for example, to use conventional large-area UV sources, preferably microwave-excited electrodeless large-area UV lamp sources, especially preferably UV-LEDs.

For a high quality of the filters, as well as the low roughness already mentioned and the low scatter, it is further important that a smooth film forms and that the cured coating does not contain any coarse, opaque particles, impurities or the like (for example dust, lint, grains having a size exceeding 200 μm, especially 0.3-1.5 mm). Because of this requirement, in the case of production of filter layers, it is necessary to assure excellent quality in relation to cleanliness in production. Ideally, production is effected under cleanroom conditions (cleanroom class <10 000).

Filters may also have more than one filter layer 3. In one such variant of the invention, further filter layers 3' preferably have different absorption properties, i.e., for example, absorption bands each at other wavelengths. One or more filter layers 3' may be disposed on the underside of the substrate 2 between substrate 2 and layer 4' or on the top side of the substrate below or below the filter layer 3. This variant is preferred over a variant in which more than one dye is present in one filter layer 3 in cases when interactions of the dye molecules result in unwanted optical effects. Since the filter layers of the invention may have a high homogeneity of the layer thickness, filters having two or more filter layers also have very good to adequate optical homogeneity.

In addition, the filter of the invention may comprise transmission-altering multilayers 4, 4' and 5. Multilayers generally comprise sequences of layers having high and low refractivity composed of nitrides, oxides, oxynitrides of metals or mixtures thereof, and may be applied to the filter, for example, by PVD methods such as sputtering, vapor deposition, etc., or PECVD methods.

For example, such a transmission-altering multilayer may largely reflect or block electromagnetic radiation in the infrared region above 650 nm to 1000 nm, preferably to 1200 nm, such that the stop band, for example, of the filter shown in FIG. 3 is extended in the direction of longer wavelengths. In the prior art, such reflective multilayers are used as the sole layer that affects IR radiation. Because of the scattered light generated by the reflection, however, there is generally formation of ghost images. Surprisingly, no ghost images occur even in the case of combination of the filter layers according to this invention with such multilayers. It is assumed that the absorbing layers the scattered light formed by the multilayers is absorbed by the filter layer.

When used in conjunction with the organic filter layer, the design of the multilayers can be adjusted such that the combined wavelength-dependent transmission of the entire filter corresponds to the desired specification. A particularly critical factor here is the $T_{50}II$ value, which is considered to be a central part of the optical specification. The absorption edge of the multilayer at short wavelengths has to be shifted here toward longer wavelengths. For the example of a blue glass filter, this absorption edge $T_{50}II$ is, for example, at 630 nm. This absorption edge is already achieved essentially by virtue of the absorption of the organic filter layer, and so the multilayer here should have a high transmission above 80%, in order to achieve the overall transmission. This enables a more tolerant design of the multilayer in which, for example, a less steep flank and a lower suppression of transmission are sufficient to achieve the overall transmission. Overall, it is possible by virtue of this combination to produce technically simpler and hence less expensive multilayers. The design of such multilayers is known to those skilled in the art and can be conducted efficiently with the aid of optical layer design software, for example TFCalc from Software Spectra Inc. In order to include the effect of the organic filter layer, the transmission and reflection of the organic filter layer can be converted to the optical constants of a substrate glass and hence taken into account in the layer design. The person skilled in the art knows how the optical transmission and reflection of the organic filter curve can be converted, for example, to the Sellmeyer coefficients that a program such as TFCalc uses. The adjustment of the multilayer design is accomplished by adjusting the number and thickness of the individual layers.

Preferably, reflections on the front side and reverse side of the filter are reduced or prevented by the application of antireflection coatings 4, 4', such that the overall transmission in the optical region increases noticeably. It is possible here for more than a 6% transmission gain to be achieved in the absorption-free wavelength range. Such antireflection coatings are generally also multilayers as described above. By appropriate layer design, it is possible to combine the antireflection function with the function of broadening the stop band as described above in a multilayer.

In addition, adhesion promoters may be applied between the substrate and filter layer or filter system, preferably inorganic adhesion promoters such as porous $SiO_2$ layers, for example by means of a pyrolysis (for example flame treatment with HMDSO) or sol-gel method, especially preferably organic adhesion promoters consisting of hexamethyldisilazane (HMDS), epoxy groups, methacrylate groups, acrylate groups, amino groups, vinyl groups and thiol groups in highly dilute alcoholic solution or by means of a CVD method.

It is optionally possible to additionally apply functional layers such as anti-scratch layers, anti-corrosion layers, smoothing layers, easy-to-clean layers and the like to the filter layer or the filter layer system as well, or to the substrate surface opposite the filter layer or the filter layer system, or a combination of these described layers and arrangements thereof.

The present invention further relates to the use of the filter of the invention. More particularly, the filter can be used as a filter element in the beam path of optically sensitive semiconductor detectors, for example a CMOS (complementary metal oxide semiconductor) sensor or CCD (charge coupled device) sensor. Semiconductor detectors of this kind can be employed, for example, as image sensors in digital cameras or video cameras or in spectroscopy.

By virtue of the process of the invention, it is possible to produce very homogeneous filter layers even over relatively large areas. Thus, the filters or wafers of the invention are suitable for production of filters for use in wafer-level packaging (WLP) processes as well. The substrate (2), "glass wafer" hereinafter, does not have the dimensions of an individual filter in such a case, but the dimensions of a wafer on which a multitude of filter elements has been provided. In the case of WLP processes, the semiconductor wafers along with the optically active sensors and a glass wafer (2) filter layer (3) are mounted one directly above another, with distances between the glass surface and semiconductor chip of less than 1 mm, such that the optical beam path from the light source falls on the sensor through the filter (1). When mounting the glass wafer above the sensor chip, it is simultaneously possible to apply seals, such that the sensor chip is hermetically protected from the environment. The mounting can be effected either by bonding processes or else by a soldering process in which either a metallic seal is achieved by means of a low-melting solder or else a vitreous bond is achieved by means of a low-melting glass solder. Typically, for processes of this kind, a glass wafer (1) having a coefficient of thermal expansion in the region of the coefficient of thermal expansion of the silicon chip is used. As an example of a suitable glass substrate, it is possible to use the glass AF32 (SCHOTT AG) which, with a thermal expansion of $3.2 \cdot 10^{-6} K^{-1}$, is matched particularly well to the silicon substrate. In the case of bonding processes, the coefficient of thermal expansion is less critical, and so it is also possible to use glasses having higher coefficients of thermal expansion, for example the glass D263eco (SCHOTT AG) having a coefficient of thermal expansion of $7.2 \cdot 10^{-6} K^{-1}$. The great advantage of the WLP process is based on bonding of filter and sensor to one another in wafer form and individualization into individual chips only thereafter.

The present invention thus further relates to a glass wafer on which a multitude of the filters of the invention has been provided and which has the same structure as described in FIG. 1 for the filter of the invention. Such a glass wafer may have a diameter of, for example, 8 or 12 inches.

In a further embodiment, the CMOS sensor can be combined with the filter (3) by "pick-and-place" processes. In this case, the CMOS sensor can be hermetically sealed and protected by the filter (3) by similar bonding and soldering processes processes to those described above. The individualization of the CMOS chips and glass wafers prior to mounting enables a further product variant in which the filter (3) and the CMOS chip have different sizes.

As described above, heat-resistant variants of the filter of the invention are suitable for use as a substrate for printed circuit boards. Thus, in addition to the optical filter effect, it is also possible for electrically conductive, structured electrodes to be applied outside the optical beam path, in order to form contacts with the CMOS chip and/or the contacts of an electrical circuit board. In specific embodiments, the electrically conductive conductor tracks can form contacts with both the contacts of the CMOS chip on the front side and the contacts of an electrical circuit board beneath the CMOS chip and establish an electrical connection. In these cases, the sizes of the glass chip differ from the size of the silicon chip, since the conductor tracks are conducted geometrically beyond the silicon chip in order to enable contact connection externally.

The present invention is illustrated in detail hereinafter by examples, but is not restricted to the embodiments described in the examples.

Filters of the invention were produced according to the conditions specified in tables 1a and 1b. The substrates used were glass wafers of thickness 0.5 to 0.7 mm (for example 0.1 mm, 0.145 mm, 0.21 mm, 0.3 mm, 0.4 mm, 0.5 mm and 0.7 mm) composed of AF32 or D263 or D263Teco (SCHOTT AG).

TABLE 1A

| | Ex. 1 | Ex. 2 | Ex. 3 | Ex. 4 | Ex. 5 |
|---|---|---|---|---|---|
| Binder component(s) | Desmodur ® BL 3175 SN/Desmophen ® 651 MPA | GPTES | Desmodur ® BL 3175 SN/Desmophen ® 670 | Desmodur ® BL 3272 MPA/Desmophen ® 680 BA | Desmodur ® BL 3272 MPA/Desmophen ® 651 MPA |
| Weight of binder [% by wt.] | 70.67 | 51.82 | 70.67 | 70.67 | 70.67 |
| Solvent (S) | alkyl ketone | alcohol | alkyl ketone | alkyl ketone | alkyl ketone |
| Weight of S [% by wt.] | 28.27 | 46.63 | 28.27 | 28.27 | 28.27 |
| Dye | phthalo-cyanine | phthalo-cyanine | phthalo-cyanine + porphyrin | phthalo-cyanine + tetrakis-ammonium | phthalo-cyanine + copper(II) acetylace-tonate |
| Weight of dye [% by wt.] | 0.56 | 1.55 | 0.56 + 0.35 | 0.56 | 0.56 + 0.56 |
| Additives | acrylated poly-siloxanes | none | acrylated poly-siloxanes | acrylated poly-siloxanes | acrylated poly-siloxanes |
| Weight of additives [% by wt.] | 0.50 | 0.50 | 0.50 | 0.50 | 0.50 |
| Production | | | | | |
| Spin-coating conditions | Step 1: 800 rpm/ 10 s Step 2: 1500 rpm 20 s Step 3: 4000 rpm 10 s | Step 1: 200 rpm/ 5 s Step 2: 500 rpm 5 s Step 3: 1000 rpm 10 s | Step 1: 800 rpm/ 10 s Step 2: 1500 rpm 20 s Step 3: 4000 rpm 10 s | Step 1: 800 rpm/ 10 s Step 2: 1500 rpm 20 s Step 3: 4000 rpm 10 s | Step 1: 800 rpm/ 10 s Step 2: 1500 rpm 20 s Step 3: 4000 rpm 10 s |
| Temp./curing time | 180° C. 70 min | 200° C. 60 min | 180° C. 70 min | 180° C. 60 min | 180° C. 50 min |

TABLE 1B

| | Ex. 6 | Ex. 7 | Ex. 8 | Ex. 9 |
|---|---|---|---|---|
| Binder component(s) | Desmodur ® BL 3272/ Desmophen ® 651 MPA | Desmodur ® BL 3272/ Desmophen ® 651 MPA | Desmodur ® BL 3272/ Desmophen ® 651 MPA | Desmodur ® BL 3272/ Desmophen ® 651 MPA |
| Weight of binder [% by wt.] | 69.96 | 69.41 | 70.27 | 69.72 |
| Solvent 1 (S) | EMK | EMK | EMK | EMK |
| Weight of S1 [% by wt.] | 20.98 | 20.82 | 21.08 | 20.92 |
| Solvent 2 (S) | PGMEA | PGMEA | PGMEA | PGMEA |
| Weight of S2 [% by wt.] | 6.98 | 6.94 | 7.03 | 6.97 |
| Dye | phthalo-cyanine | phthalo-cyanine | phthalo-cyanine | phthalo-cyanine |
| Weight of dye [% by wt.] | 1.58 | 2.33 | 1.12 | 1.89 |
| Additives | acrylated polysiloxanes | acrylated polysiloxanes | acrylated polysiloxanes | acrylated polysiloxanes |
| Weight of additives [% by wt.] | 0.50 | 0.50 | 0.50 | 0.50 |
| Intermediate layer | 0.1% mercaptosilane in 99.9% ethanol | 0.1% mercaptosilane in 99.9% ethanol | 0.1% mercaptosilane in 99.9% ethanol | 0.1% mercaptosilane in 99.9% ethanol |
| Production | | | | |
| Spin-coating conditions for intermediate layer | Step 1: 800 rpm 10 s Step 2: 1500 rpm 20 s Step 3: 4000 rpm 10 s | Step 1: 800 rpm 10 s Step 2: 1500 rpm 20 s Step 3: 4000 rpm 10 s | Step 1: 800 rpm 10 s Step 2: 1500 rpm 20 s Step 3: 4000 rpm 10 s | Step 1: 800 rpm 10 s Step 2: 1500 rpm 20 s Step 3: 4000 rpm 10 s |
| Spin-coating conditions for | Step 1: 800 rpm 5 s | Step 1: 800 rpm 5 s | Step1: 800 rpm 5 s | Step1: 800 rpm 5 s |

TABLE 1B-continued

|  | Ex. 6 | Ex. 7 | Ex. 8 | Ex. 9 |
| --- | --- | --- | --- | --- |
| varnish | Step 2: 3000 rpm 30 s | Step 2: 3000 rpm 30 s | Step 2: 6000 rpm 30 s | Step 2: 6000 rpm 30 s |
| Drying | 100° C. 4 min | 100° C. 4 min | 100° C. 4 min | 100° C. 4 min |
| Temp./curing time | 180° C. 70 min | 180° C. 70 min | 180° C. 70 min | 180° C. 70 min |

Table 2 summarizes the properties of the filters of the invention produced.

TABLE 2

| Properties | Ex. 1, 6, 7, 8, 9 | Ex. 2 | Ex. 3 | Ex. 4 | Ex. 5 |
| --- | --- | --- | --- | --- | --- |
| Layer thickness | + | + | + | + | + |
| Bond strength | + | ○ | + | ○ | + |
| Chemical stability | ○ | ○ | + | ○ | ○ |
| Climatic stability | + | + | + | + | + |
| Haze | + | + | + | + | + |
| Homogeneity | + | + | + | + | + |
| Thermal stability | + | + | + | + | + |
| Transmission properties | + | − | + | + | + |
| Absorption properties | + | − | + | + | + |

The legends are as follows:

|  | + | ○ | − |
| --- | --- | --- | --- |
| Layer thickness | <10% deviation | 10-15% deviation | >15% deviation |
| Bond strength | no detachment | detachment < 2% of the test area | detachment > 2% of the test area |
| Chemical stability | no detachment// change in transmission < 5% | detachment < 2% of the test area//5-10% | detachment < 2% of the test area//> 10% |
| Climatic stability | deviation in transmission < 5% | 5-10% | >10% |
| Haze | <4% | 4-8% | >8 |
| Homogeneity over the wafer surface | deviation in transmission < 5% | 5-10% | >10% |
| Thermal stability | deviation in transmission < 5% | 5-10% | >10% |
| Band edge $T_{50}$ (at 650 nm) | <25 nm | 25-40 nm | >40 nm |

Example 5

The coating solution from example 1 was applied to the substrate by a screen-printing method. The transmission curve is shown in FIG. 7 in comparison with a filter applied by a spin-coating method.

What is claimed is:

1. An optical filter comprising:
   a substrate; and
   a filter layer on at least one side of the substrate, the filter layer comprising a matrix and at least one organic dye dissolved in the matrix, wherein the filter layer has optical homogeneity, and
   wherein the optical filter has high thermal stability at a temperature in the range from 220 to 270° C.,
   wherein the substrate and filter layer are configured so that the optical filter is an IR-cut filter,
   wherein the substrate and filter layer are configured so that the optical filter has a mean transmission of not more than 40% in a stop band from 650 nm to 700 nm,
   wherein the filter layer has a wavelength deviation at $T_{50}$II of not more than 5%, and
   wherein $T_{50}$II describes a wavelength at which 50% transmission is exceeded and indicates entry into the stop band.

2. The optical filter as claimed in claim 1, wherein the wavelength deviation at $T_{50}$II is not more than 3%.

3. The optical filter as claimed in claim 1, wherein the substrate comprises a glass having a transmission of at least 90% in a spectral range from 400 nm to 800 nm.

4. The optical filter as claimed in claim 1, wherein the filter layer has a thickness of not more than 100 µm.

5. The optical filter as claimed in claim 1, wherein the substrate and filter layer are configured so that the optical filter has a thickness of not more than 1 mm.

6. The optical filter as claimed in claim 1, wherein the substrate and filter layer are configured so that the optical filter has a haze value of less than 10%.

7. The optical filter as claimed in claim 1, wherein the substrate and filter layer are configured so that the optical filter has a haze value of less than 1%.

8. The optical filter as claimed in claim 1, wherein the stop band is from 650 nm to 750 nm.

9. The optical filter as claimed in claim 1, further comprising at least one further layer, the at least one further layer lowering a transmission in an IR range, the at least one further layer being selected from the group consisting of a multilayer, a further filter layer, and combinations thereof.

10. The optical filter as claimed in claim 1, further comprising an antireflection coating of one or more layers.

11. The optical filter as claimed in claim 10, wherein the antireflection coating is at a location selected from the group consisting of on the filter layer, on a side of the substrate opposite the filter layer, and on both the filter layer and on the side of the substrate opposite the filter layer.

12. The optical filter as claimed in claim 1, further comprising an intermediate layer on the substrate between the substrate and the filter layer, the intermediate layer providing a bond strength between the filter layer and the substrate.

13. The optical filter as claimed in claim 1, wherein the substrate is a wafer.

14. The optical filter as claimed in claim 1, wherein the optical filter is configured for use in a beam path of an optically sensitive semiconductor detector.

15. The optical filter as claimed in claim 14, wherein the optically sensitive semiconductor detector is a CMOS sensor.

16. The optical filter as claimed in claim 1, wherein the optical filter is configured for use in a device selected from the group consisting of a digital camera, a video camera, and a spectroscope.

17. The optical filter as claimed in claim 1, wherein the optical filter is configured for use in a wafer-level packaged device.

18. A process for producing the optical filter of claim 1, comprising the following steps:
dissolving the at least one organic dye in the matrix to produce a varnish;
applying the varnish to the substrate; and
setting the varnish to form the filter layer using a process selected from the group consisting of drying, thermal curing, UV curing, and combinations thereof.

19. An optical filter comprising:
a substrate; and
a filter layer on one side of the substrate, the filter layer comprising a matrix and an organic dye dissolved in the matrix, wherein the filter layer has optical homogeneity, and wherein the matrix comprises a binder selected from the group consisting of a sol-gel-compound, a polyurethane resin, a hybrid polymer, and mixtures thereof,
wherein the substrate and filter layer are configured so that the optical filter has a mean transmission of not more than 40% in a stop band from 650 nm to 700 nm, wherein the filter layer has a wavelength deviation at $T_{50}II$ of not more than 5%, and
wherein $T_{50}II$ describes a wavelength at which 50% transmission is exceeded and indicates entry into the stop band.

20. The optical filter as claimed in claim 19, wherein the organic dye is selected from the group consisting of phthalocyanines, porphyrins, and mixtures thereof.

21. The optical filter as claimed in claim 19, wherein the organic dye comprises a pthalocyanine having a central atom selected from the group consisting of lead, zinc, aluminum, gallium, silicon, titanium, copper, and vanadium.

22. The optical filter as claimed in claim 19, wherein the organic dye comprises a pthalocyanine having no central atom.

23. The optical filter as claimed in claim 19, wherein the matrix comprises reaction products of a polyisocyanate component and a polyol component.

24. The optical filter as claimed in claim 19, wherein the matrix comprises reaction products of hexamethylene diisocyanate and polyol.

25. The optical filter as claimed in claim 19, wherein the matrix comprises reaction products of sol-gel precursors selected from the group consisting of silicon, titanium, zirconium, aluminum, zinc, magnesium, calcium, tin, and any mixtures thereof.

26. The optical filter as claimed in claim 25, wherein the sol-gel precursors are selected from the group consisting of Si(ORx)Ry, Ti(ORx)Ry, Zr(ORx)Ry, Al(ORx)Ry, Zn(ORx)Ry, Mg(ORx)Ry, Ca(ORx)Ry, and Sn(ORx)Ry.

27. The optical filter as claimed in claim 19, wherein the matrix comprises glycidyloxypropyltriethoxysilane (GPTES) and/or methacryloyloxypropyltrimethoxysilane.

* * * * *